US012042445B2

(12) United States Patent
Rustad

(10) Patent No.: US 12,042,445 B2
(45) Date of Patent: Jul. 23, 2024

(54) ADJUSTABLE CHAIR

(71) Applicant: Dane Rustad, St. Paul, MN (US)

(72) Inventor: Dane Rustad, St. Paul, MN (US)

(73) Assignee: Dane Rustad, St. Paul, MN (US)

(*) Notice: Subject to any disclaimer, the term of this patent is extended or adjusted under 35 U.S.C. 154(b) by 0 days.

(21) Appl. No.: 17/874,748

(22) Filed: Jul. 27, 2022

(65) Prior Publication Data

US 2024/0033147 A1 Feb. 1, 2024

(51) Int. Cl.
*A61G 5/10* (2006.01)
*A61G 5/08* (2006.01)

(52) U.S. Cl.
CPC .............. *A61G 5/0825* (2016.11); *A61G 5/10* (2013.01)

(58) Field of Classification Search
CPC .......... A61G 5/0825; A61G 5/10; A61G 5/08; A61G 5/0883; A61G 5/0816; A61G 5/1062; A47C 7/14
USPC .......................................................... 280/650
See application file for complete search history.

(56) References Cited

U.S. PATENT DOCUMENTS

| | | | | |
|---|---|---|---|---|
| 3,050,050 A | | 8/1962 | Kubicek | |
| 4,574,901 A | | 3/1986 | Joyner | |
| 5,083,551 A | | 1/1992 | Addison, Jr. | |
| 7,387,339 B2 | * | 6/2008 | Bykov | A47C 7/024 297/354.11 |
| 8,220,872 B2 | * | 7/2012 | Hong | A47C 7/024 297/344.17 |
| 8,419,047 B2 | * | 4/2013 | Chen | A61G 5/0816 280/647 |
| 9,301,896 B2 | | 4/2016 | Hsieh | |
| 9,375,370 B2 | * | 6/2016 | Horacek | A61G 5/1054 |
| 9,849,050 B2 | | 12/2017 | McClean | |
| 2007/0145723 A1 | * | 6/2007 | Kamara | A61G 5/1059 280/647 |
| 2007/0273124 A1 | * | 11/2007 | Nishi | A61G 5/0883 280/250.1 |
| 2010/0194077 A1 | * | 8/2010 | Wagner | A61G 5/08 280/650 |
| 2012/0086252 A1 | * | 4/2012 | Hong | A47C 9/025 297/344.21 |
| 2016/0058637 A1 | * | 3/2016 | Horacek | A61G 5/1054 280/649 |
| 2016/0270989 A1 | * | 9/2016 | Yentzer | A61G 5/02 |
| 2020/0196956 A1 | * | 6/2020 | Dellow | A61G 5/10 |
| 2020/0246207 A1 | * | 8/2020 | Williams | A61G 5/1051 |
| 2020/0405552 A1 | * | 12/2020 | Yoon | A61G 5/0825 |

* cited by examiner

*Primary Examiner* — James A Shriver, II
*Assistant Examiner* — Hilary L Johns
(74) *Attorney, Agent, or Firm* — MUETING RAASCH GROUP

(57) ABSTRACT

A chair is disclosed having a chair frame and a seating surface having a first side surface movably coupled to the frame, and a second side surface coupled to the frame. The first side surface is independently moveable relative to the second side surface. Each of the first side surface and the second side surface define a front end of the seating surface and a back end of the seating surface. A first actuator is coupled to the frame, where the first actuator is configured for operative communication with the first side surface.

17 Claims, 3 Drawing Sheets

ADJUSTABLE CHAIR

TECHNOLOGICAL FIELD

The present disclosure is generally related to a chair. More particularly, the present disclosure is related to an adjustable chair.

SUMMARY

Some embodiments of the technology disclosed herein relate to a chair. The chair has a chair frame and a seating surface having a first side surface movably coupled to the frame and a second side surface coupled to the frame. The first side surface is independently moveable relative to the second side surface. Each of the first side surface and the second side surface define a front end of the seating surface and a back end of the seating surface. A first actuator is coupled to the frame. The first actuator is configured for operative communication with the first side surface.

In some such embodiments, the chair has wheels coupled to the frame. Additionally or alternatively, the wheels include drive wheels and caster wheels. Additionally or alternatively, each of the first side surface and the chair frame has a first siderail and a second siderail and the first side surface is pivotably coupled to the first siderail, and the second side surface is pivotably coupled to the second siderail. Additionally or alternatively, the chair has a controller operatively coupled to the first actuator, where the controller is configured to receive user input to control and direct movement of the first side surface. Additionally or alternatively, the chair has a second actuator in operative communication with the second side surface.

Additionally or alternatively, the seating surface has a collapsed position and an expanded position, and the chair has a greater width when the seating surface is in an expanded position than the width of the chair in the collapsed position. Additionally or alternatively, the chair has a back support coupled to the frame, where the width of the back support in the lateral direction in the expanded position is greater than the width of the back support in the lateral direction in the collapsed position.

Some embodiments of the technology disclosed herein relate to a chair having a chair frame and a seating surface having a first side surface and a second side surface, where the first side surface is independently moveable relative to the second side surface. Each of the first side surface and the second side surface define a front end of the seating surface and a back end of the seating surface. The seating surface having a collapsed position and an expanded position. A first actuator is coupled to the chair frame. A first mechanical communication chain is configured to mechanically couple the first actuator and the first side surface when the seating surface is in the expanded position. The first mechanical communication chain is configured to mechanically isolate the first actuator from the first side surface when the seating surface is in the collapsed position.

In some such embodiments, the first mechanical communication chain has a connector that is configured to selectively couple to and separate from a mating feature of the first actuator. Additionally or alternatively, the first mechanical communication chain has a connector that is configured to selectively couple to and separate from a mating feature of the first side surface. Additionally or alternatively, the chair has wheels coupled to the frame. Additionally or alternatively, the wheels include drive wheels and caster wheels. Additionally or alternatively, the first side surface and the second side surface are each pivotably coupled to the frame. Additionally or alternatively, the chair has a first siderail and a second siderail. The first side surface is pivotably coupled to the first siderail and the second side surface is pivotably coupled to the second siderail. Additionally or alternatively, the chair has a second actuator coupled to the chair frame. A second mechanical communication chain is configured to mechanically couple the second actuator and the second side surface when the seating surface is in the expanded position. The second mechanical communication chain is configured to mechanically isolate the second actuator from the second side surface when the seating surface is in the collapsed position. Additionally or alternatively, a controller is operatively coupled to the first actuator, where the controller is configured to receive user input to control and direct movement of the first side surface. Additionally or alternatively, the seating surface has a collapsed position and an expanded position, where the chair has a greater width when the seating surface is in an expanded position than the width of the chair in the collapsed position. Additionally or alternatively, the chair has a back support coupled to the frame, where the width of the back support in the lateral direction in the expanded position is greater than the width of the back support in the lateral direction in the collapsed position.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
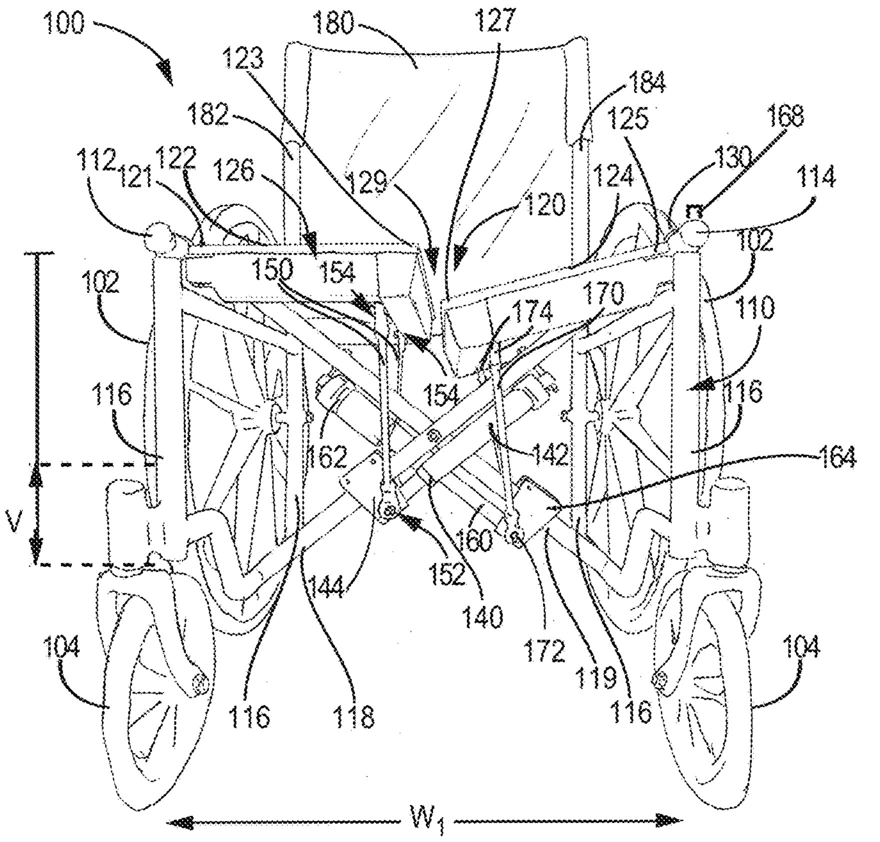
FIG. 1 is a first perspective view of an example adjustable chair consistent with the technology disclosed herein.
Figure 2:
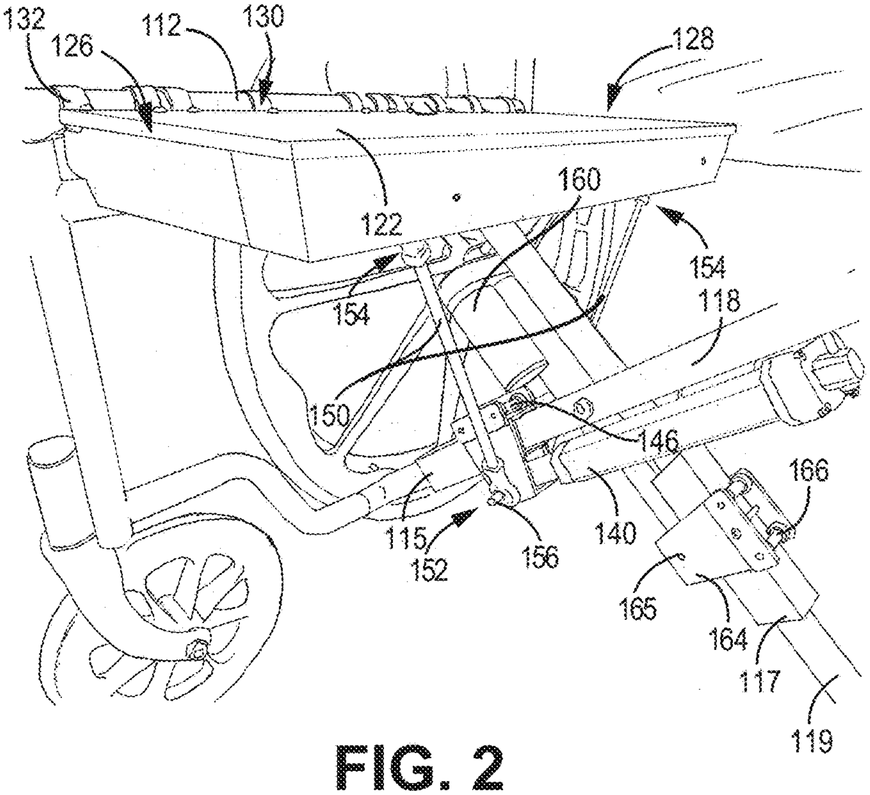
FIG. 2 is a partial detail view from a second perspective of the example chair depicted in FIG. 1, where the chair is in a partially collapsed configuration.
Figure 3:
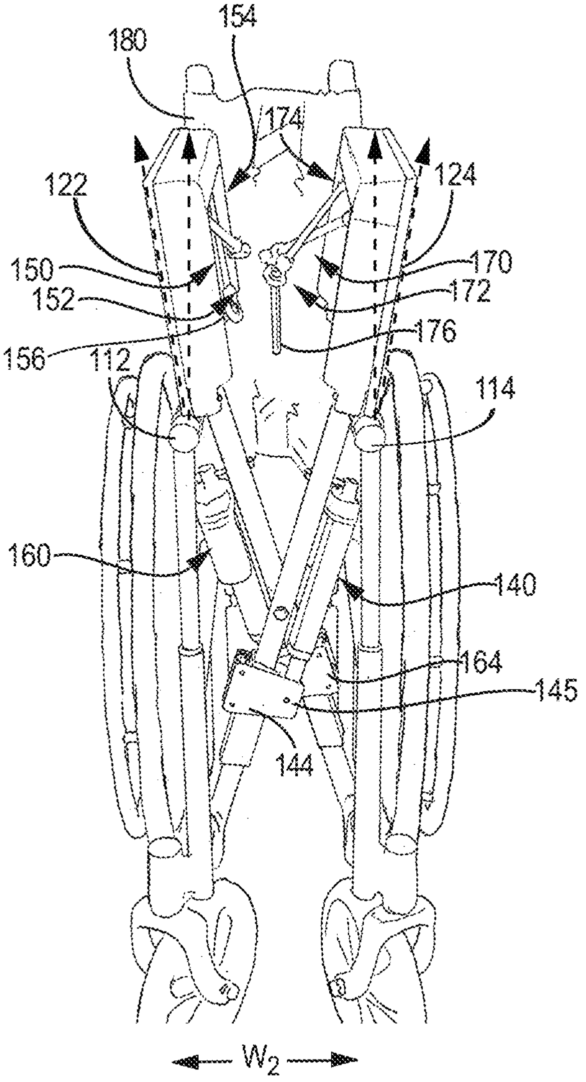
FIG. 3 is a perspective view of the example chair depicted in FIG. 1 in a collapsed configuration.

FIG. 1 is a perspective view of an example chair 100 consistent with various implementations of the current technology, and FIG. 2 is a partial detail view of the example chair 100 from a second perspective, where the chair 100 is in a partially collapsed position. FIG. 3 is a perspective view of the chair 100 in a fully collapsed configuration. The chair 100 is generally configured to receive a seated user. More particularly, the chair 100 has a seating surface 120 that is generally configured to receive a seated user. The seating surface 120 is generally configured to be adjusted by a user. The chair 100 generally has a chair frame 110 and the seating surface 120. The chair frame 110 is generally configured to support various components of the chair, including the seating surface 120.

The seating surface 120 has a first side surface 122 and a second side surface 124. The first side surface 122 and the second side surface 124 cumulatively define the seating surface 120. Each of the first side surface 122 and the second side surface 124 define a front end 126 of the seating surface 120 and a back end 128 of the seating surface 120, which is best visible in FIG. 2. Each of the first side surface 122 and the second side surface 124 extend from the front end 126 to the back end 128 of the seating surface 120.

In various embodiments, first side surface 122 and the second side surface 124 are generally discrete, separate components. In the current example, the first side surface 122 and the second side surface 124 define a lateral gap 129. The lateral gap 129 extends from the front end 126 of the seating surface 120 to the back end 128 of the seating surface 120. The first side surface 122 extends from a first outer edge 121 to a first inner edge 123, where the first inner edge 123 defines the lateral gap 129. Similarly, the second side surface 124 extends from a second outer edge 125 to a second inner edge 127, where the second inner edge 127 also defines the lateral gap 129.

The first side surface 122 and the second side surface 124 are each coupled to the frame 110. The first side surface 122 is moveably coupled to the frame 110. The first side surface 122 is generally independently moveable relative to the second side surface 124. In some embodiments, the second side surface 124 is moveably coupled to the frame 110, however, in some other embodiments the second side surface 124 can be fixed to the frame 110 such that the second side surface 124 is non-movable relative to the frame 110.

The movability of the first side surface 122 relative to the second side surface 124 may advantageously allow shifting of pressure points between a seated user and the seating surface 120. Such a configuration may advantageously improve blood circulation for individuals who are seated on the seating surface for relatively long periods of time. The movability of the first side surface 122 relative to the second side surface 124 may advantageously prevent the obstruction of veins and arteries extending along a user's legs compared to configurations where, for example, a front portion of a seating surface is moveable relative to a back portion of the seating surface.

The frame 110 has a first siderail 112 extending along the first outer edge 121 of the first side surface 122. The first siderail 112 extends between the front end 126 and the back end 128 of the seating surface 120. The frame 110 can have a second siderail 114 extending along the second outer edge 125 of the second side surface 124. The frame 110 can have a plurality of vertical support rails 116 extending between the first siderail 112 and the ground. Similarly, the frame 110 can have a plurality of vertical support rails 116 extending between the second siderail 114 and the ground.

The first siderail 112 can be coupled to the first side surface 122. In some embodiments, the first side surface 122 is pivotably coupled to the frame 110. In the current example, a plurality of brackets 130 are fixed to the first side surface along the first outer edge 121. The first siderail 112 is a cylindrical rod or tube having an outer circumferential boundary along the length of the first siderail 112. Each of the plurality of brackets 130 defines a circumferential receptacle 132 that pivotably receives the outer circumferential boundary of the first siderail 112. The circumferential receptacle 132 at least partially surrounds the first siderail 112. In various embodiments, each of the plurality of brackets 130 fixes the vertical relative position between the first outer edge 121 and the first siderail 112 but accommodates pivoting of the first side surface 122 relative to the first siderail 112. In some embodiments, one or more bearings can be disposed between the first siderail 112 and each of the brackets 130 to further facilitate pivoting of the first side surface 122 relative to the first siderail 112.

Other approaches to pivotably coupling the first siderail 112 to the first side surface 122 can also be used. In some embodiments a hinge can be used where a first leaf of the hinge is fixed to the first side surface 122 and a second leaf of the hinge is fixed to the first siderail 112 and a knuckle and pin assembly coupling the first leaf and the second leaf accommodates pivoting of the first side surface 122 relative to the first siderail 112. In yet other embodiments, the first siderail 112 and the first side surface 122 are coupled via ball joints, such as at each end of the first siderail 112, which accommodate pivoting of the first side surface 122 relative to the first siderail 112.

The second siderail 114 can be coupled to the second side surface 124. In various embodiments the second siderail 114 has the same configuration as the first siderail 112. In some embodiments the second side surface 124 is fixed to the second siderail 114. In some other embodiments the second side surface 124 is movable relative to the second siderail 114. In some embodiments the second side surface 124 is pivotable relative to the second siderail 114. The second side surface 124 can be coupled to the second siderail 114 similarly to how the first side surface 122 is coupled to the first siderail 112. In some other embodiments the second side surface 124 can be coupled to the second siderail 114 via a different mechanism than that used to couple the first side surface 122 to the first siderail 112. In embodiments, the first side surface 122 is pivotably coupled to the first siderail 112 and the second side surface 124 is pivotably coupled to the second siderail 114.

In various embodiments, the seating surface 120 has a collapsed position and an expanded position. The collapsed position is generally configured to accommodate storage and/or transport of the chair 100. The expanded position is generally configured to accommodate a seated user on the seating surface 120 of the chair 100. In the expanded position, the first side surface 122 of the seating surface 120 can have a range of positions relative to the first siderail 112 to accommodate a seated user. Such a configuration may allow a user to shift the location and degree of pressure between the user and the seating surface 120, which may be particularly advantageous for users that are bound to a seated position for long periods of time. Similarly, in embodiments where the second side surface 124 is moveable relative to the chair frame 110, the second side surface 124 can have a range of positions relative to the second siderail 114 in the expanded position of the seating surface 120.

In some embodiments, when the chair 100 is in the collapsed position the first side surface 122 and the second side surface 124 are within 25° or 20° of a vertical orientation, an example of which is depicted in FIG. 3. In some embodiments, the first side surface 122 and the second side surface 124 are within 15° or 10° of a vertical orientation in a collapsed position of the seating surface 120. In the expanded position the first side surface 122 and the second side surface 124 are generally within 45°, 40°, 35°, or even 30° of a horizontal position, as depicted in FIG. 1. In some embodiments, the chair 100 has a first width $W_1$ when the chair 100 is in an expanded position (FIG. 1) and a second width $W_2$ when the chair 100 is a collapsed position, where the second width $W_2$ is less than the first width $W_1$. Each of the first width $W_1$ and the second width $W_2$ can be the lateral distance between the first siderail 112 and the second siderail 114, for example.

In the embodiment depicted, the chair 100 has a back support 180 coupled to the chair frame 110 that is configured to support the back of a seated user. The back support 180 is positioned towards the back end of the chair frame. In various embodiments the back support 180 is a flexible material such as a fabric. In embodiments consistent with the current example, the back support 180 is laterally collapsible to accommodate the collapsing and expanding of the chair 100 between the first width $W_1$ and the second width $W_2$. In some embodiments the chair 100 has a first vertical frame component 182 rigidly coupled to the first siderail 112 and a second vertical frame component 184 rigidly coupled to the second siderail 114. The back support 180 can be coupled to the first vertical frame component 182 and the second vertical frame component 184 such that the back support 180 extends laterally across first vertical frame component 182 and the second vertical frame component 184. In a collapsed position, the first vertical frame component 182 and the second vertical frame component 184 can be positioned closer in the lateral direction relative to the expanded position of the chair 100. As follows, in the collapsed position the back support 180 can have a width in the lateral that is less that the width of the back support 180 when the chair 100 is in the expanded position.

In various embodiments the first side surface 122 and the second side surface 124 are configured to be pivoted upward from the expanded position (FIG. 1) to the collapsed position (FIG. 3). In some embodiments the first side surface 122 and the second side surface 124 are configured to be pivoted in opposite directions about the first siderail 112 and the second siderail 114, respectively, towards a collapsed position. For example, relative to FIG. 3, the first side surface 122 has been pivoted in a counterclockwise direction about the first siderail 112 and the second side surface 124 has been pivoted in a clockwise direction about the second siderail 114.

The first side surface 122 and/or the second side surface 124 can be manually pivotable, in some embodiments, such that the first side surface 122 and/or the second side surface 124 can be manually grasped by a user and pivoted by applying a pulling or pushing force. In some such embodiments a ratcheting mechanism can be operatively disposed between each of the first side surface 122 and/or the second side surface 124 and the chair frame 110. In some other embodiments the first side surface 122 and/or the second side surface 124 is manually pivotable via a mechanical pivoting mechanism that is operatively coupled to each of the first side surface 122 and/or the second side surface 124. For example, a crank, lever, or the like can be operatively disposed between each of the first side surface 122 and/or the second side surface 124 and the chair frame 110.

In the examples consistent with the current figures, an actuator 140 is coupled to the frame 110. The actuator 140 is in operative communication with the first side surface 122 to move, and in various embodiments pivot, the first side surface 122 relative to the first siderail 112. In the current example, the actuator 140 is a linear actuator. In some other embodiments the actuator 140 can be a rotary actuator. The actuator 140 can be operated through a variety of different mechanisms and combinations of mechanisms including electric, hydraulics, pneumatics, manual, and the like. In some embodiments the chair 100 can include a battery or an electrical cord that is configured to provide electrical power to the actuator 140.

In the current example, the actuator 140 has a first end 142 fixed to the chair frame 110, and a second end 144 that is linearly translatable relative to the first end 142. The second end 144 of the actuator 140 is linearly translatable across a range of vertical distances V from the first siderail 112. A first mechanical communication chain 150 extends from the second end 144 of the actuator 140 to the first side surface 122, towards the first inner edge 123 of the first side surface 122. In the current example, the first mechanical communication chain 150 includes a first pair of rigid linkages 150, each having a first end 152 pivotably coupled to the second end 144 of the actuator 140 (such as on opposite sides of a first diagonal support rail 118) and a second end 154 pivotably coupled to the first side surface 122. As the second end 144 of the actuator 140 is linearly translated across the range of vertical distances V, the first end 152 of each of the first rigid linkages 150 is linearly translated across the range of vertical distances V, which results in linear translation of each second end 154 through a corresponding range of vertical distances. Vertical translation of the second end 154 of the first rigid linkage 150 results in vertical translation of the first inner edge 123 of the first side surface 122, resulting in pivoting of the first side surface 122 relative to the first siderail 112.

In the current example, the second end 154 of one rigid linkage of the first pair of rigid linkages 150 is coupled to the first side surface 122 towards the front end 126 and the second end 154 of the second rigid linkage of the first pair of rigid linkages 150 is coupled to the first side surface 122 towards the back end 128. In some other embodiments a single first rigid linkage 150 can be used. In such an example, the second end 154 of the first rigid linkage 150 can be coupled to the first side surface 122 centrally between the front end 126 and the back end 128.

In the current example, the chair frame 110 has a first diagonal support rail 118 that extends from a lower portion of the chair frame 110 to the second siderail 114. The first end 142 of the actuator 140 is fixed relative to the diagonal support rail 118. The second end 144 of the actuator 140 is configured to be linearly translated along a portion of the extension of the diagonal support rail 118. In some other embodiments the first end 142 of the actuator 140 is fixed relative to a vertical support rail 116 and the second end 144 of the actuator 140 is linearly translated along the vertical support rail 116.

In embodiments, the second end 144 of the actuator 140 engages the first diagonal support rail 118 for translation along the first diagonal support rail 118. In the current example, the second end 144 of the actuator 140 is a carriage 144 that extends around the first diagonal support rail 118. The carriage 144 has one or more rollers 146 (FIG. 2) rotatably coupled to the carriage 144. The rollers 146 are configured to contact the first diagonal support rail 118 to roll across the surface. In some embodiments, such as the one currently depicted, the first diagonal support rail 118 may have a circular cross-section, and so a contact plate 115 can be rigidly fixed to the first diagonal support rail 118 to maximize engagement of the rollers 146. In the current example, the contact plate 115 is a surface of a brace that is fixed to and surrounds at least a portion of the support rail 118.

In various embodiments, the second end 144 of the actuator 140 is configured to be fixed relative to the first end 142 of the actuator 140 absent engagement of the actuator 140, such as operation of the actuator 140 through a user input device 168 to a controller. Example controllers will be discussed in more detail below. In some embodiments the first diagonal support rail 118 and the second end 144 of the actuator 140 mutually define a ratcheting mechanism that is configured to prevent linear translation of the second end 144 of the actuator 140 in at least one direction absent operation/engagement of the actuator 140. In some embodiments the ratcheting mechanism is configured to prevent at least downward translation of the second end 144 of the actuator 140 absent operation/engagement of the actuator 140.

In some embodiments, the actuator 140 is configured to be in operative communication with the first side surface 122 when the seating surface 120 is in an expanded position (FIGS. 1-2). In some such embodiments, the actuator 140 is configured to be out of operative communication with the first side surface 122 when the seating surface 120 in a collapsed position (FIG. 3). In some embodiments, the first mechanical communication chain 150 operatively coupling the actuator 140 to the first side surface 122 is manually disengaged to configure the seating surface 120 in a collapsed position. The seating surface 120 can be manually manipulated into the collapsed position. In some other embodiments, however, the actuator 140 remains in operative communication with the first side surface 122 to move the seating surface 120 into the collapsed position.

In the examples consistent with the current figures, the actuator 140 discussed above is a first actuator, and the chair 100 has a second actuator 160 coupled to the frame 110. The second actuator 160 is in operative communication with the second side surface 124 to move, and in various embodiments pivot, the second side surface 124 relative to the second siderail 114. In the current example, the second actuator 160 is a linear actuator. In some other embodiments the second actuator 160 can be another type of actuator discussed above with respect to the first actuator 140.

In the current example, the second actuator 160 has a first end 162 fixed to the chair frame 110, and a second end 164 that is linearly translatable relative to the first end 162. The second end 164 of the second actuator 160 is linearly translatable across a range of vertical distances V from the second siderail 114. A second mechanical communication chain 170 extends from the second end 164 of the second actuator 160 to the second side surface 124, towards the second inner edge 127 of the second side surface 124. In the current example, the second mechanical communication chain 170 includes a second pair of rigid linkages 170 each having a first end 172 pivotably coupled to the second end 164 of the second actuator 160 (such as an opposite sides of a second diagonal support rail 119) and a second end 174 pivotably coupled to the second side surface 124. As the second end 164 of the second actuator 160 is linearly translated across the range of vertical distances V, the first end 172 of each of the second rigid linkages 170 is linearly translated across the range of vertical distances V, which results in linear translation of each second end 174 through a corresponding range of vertical distances. Vertical translation of the second end 174 of the second rigid linkage 170 results in vertical translation of the second inner edge 127 of the second side surface 124, resulting in pivoting of the second side surface 124 relative to the second siderail 114.

Similarly to the first pair of rigid linkages 150, here the second end 174 of one rigid linkage of the second pair of rigid linkages 170 is coupled to the second side surface 124 towards the front end 126 and the second end 174 of the second rigid linkage of the second pair of rigid linkages 170 is coupled to the second side surface 124 towards the back end 128. In some other embodiments a single second rigid linkage 170 can be used. In such an example, the second end 174 of the second rigid linkage 170 can be coupled to the second side surface 124 centrally between the front end 126 and the back end 128.

In the current example, the chair frame 110 has a second diagonal support rail 119 that extends from a lower portion of the chair frame 110 to the second siderail 114. The first end 162 of the second actuator 160 is fixed relative to the diagonal support rail 119. The second end 164 of the second actuator 160 is linearly translated along a portion of the extension of the diagonal support rail 119. In some other embodiments the first end 162 of the second actuator 160 is fixed relative to a vertical support rail 116 and the second end 164 of the second actuator 160 is linearly translated along the vertical support rail 116.

Similar to the configuration of the second end 144 of the first actuator 140, in this example, the second end 164 of the second actuator 160 engages the second diagonal support rail 119 for translation along the second diagonal support rail 119. In the current example, the second end 164 of the second actuator 160 is a carriage 164 that extends around the second diagonal support rail 119. The carriage 164 has one or more rollers 166 (FIG. 2) rotatably coupled to the carriage 144. The rollers 166 are configured to contact the second diagonal support rail 119 to roll across the surface of the support rail. In some embodiments, such as the one currently depicted, the second diagonal support rail 119 may have a circular cross-section. In some such embodiments a contact plate 117 (FIG. 2) can be rigidly fixed to the support rail 119 to maximize engagement of the rollers 166.

In some embodiments the second diagonal support rail 119 and the second end 164 of the second actuator 160 mutually define a ratcheting mechanism that is configured to prevent linear translation of the second end 164 of the second actuator 160 in at least one direction absent operation/engagement of the second actuator 160. In some embodiments the ratcheting mechanism is configured to prevent at least downward translation of the second end 164 of the second actuator 160 absent operation/engagement of the second actuator 160.

In some embodiments, the second actuator 160 is configured to be in operative communication with the second side surface 124 when the seating surface 120 is in an expanded position (FIG. 1). In some such embodiments, the second actuator 160 is configured to be out of operative communication with the second side surface 124 when the seating surface 120 in a collapsed position (FIG. 3). In some embodiments, the second mechanical communication chain 170 operatively coupling the second actuator 160 to the second side surface 124 is manually disengaged to configure the seating surface 120 in a collapsed position. The seating surface 120 can be manually manipulated into the collapsed position. In some other embodiments, however, the second actuator 160 remains in operative communication with the second side surface 124 to move the seating surface 120 into the collapsed position.

The first mechanical communication chain 150 is generally configured to mechanically couple the first actuator 140 and the first side surface 122 when the chair 100 is in an expanded position. Such a configuration advantageously allows the actuator 140 to reposition the first side surface 122 throughout a particular range in the expanded position.

In various implementations, the first mechanical communication chain 150 is configured to mechanically isolate the first actuator 140 from the first side surface 122 when the seating surface is in the collapsed position. More particularly, in various embodiments the mechanical communication chain 150 is configured to be disengaged to allow the first side surface 122 to be manually repositioned towards a collapsed position. In various embodiments the mechanical communication chain 150 is manually disengaged to mechanically isolate the first actuator 140 and the first side surface 122.

In various examples, the first mechanical communication chain 150 has a connector 156 that is configured to selectively mechanically couple and mechanically isolate the first actuator 140 relative to the first side surface 122. The connector 156 can be a feature that mechanically couples to (and selectively separates from) a mating connector of one of the first actuator 140 and the first side surface 122. In examples consistent with the current figures, the first end 152 of the first mechanical communication chain 150 defines the connector 156 that disengageably engages a mating connector 145 on the second end 144 of the first actuator 140. The first end 152 of the first mechanical communication chain 150 can be manually disengaged from the second end 144 of the first actuator 140 to mechanically isolate the first actuator 140 from the first side surface 122. Such a configuration may advantageously enable the first side surface 122 to be manually pivoted to a collapsed position. In some embodiments, the first end 152 of the first mechanical communication chain 150 includes a pin 156 (best visible in FIG. 2) that is removably inserted in a pin opening 145 (visible in FIG. 3) defined by the second end 144 of the first actuator 140. The pin 156 can be manually removed from the pin opening 145 to disengage the mechanical communication chain 150 from the first actuator 140. In some embodiments the pin 156 can have screw threads that are configured to engage mating threads around the pin opening 145.

In some other embodiments, the second end 144 of the first actuator 140 can define a pin, and the first end 152 of the mechanical communication chain 150 can define a corresponding pin opening that is configured to engage and disengage the pin. Other types of disengageable connectors between the first mechanical communication chain 150 and the first actuator 140 can also be used. For example, bayonet connectors or snap fit connectors could also be used.

Additionally or alternatively, the second end 154 of the first mechanical communication chain 150 can define a connector that disengageably engages a mating connector on the first side surface 122 of the seating surface 120. The second end 154 of the first mechanical communication chain 150 can be manually disengaged from the first side surface 122 to mechanically isolate the first actuator 140 from the first side surface 122. Additionally or alternatively, the first mechanical communication chain 150 can incorporate a manually engageable and disengageable connector between the first end 152 and the second end 154 of the mechanical communication chain 150 that selectively mechanically couples and mechanically isolates the first actuator 140 from the first side surface 122.

The second mechanical communication chain 170 is generally configured to mechanically couple the second actuator 160 and the second side surface 124 when the chair 100 is in an expanded position. Such a configuration advantageously allows the second actuator 160 to reposition the second side surface 124 throughout a particular range in the expanded position. In various implementations, the second mechanical communication chain 170 is configured to mechanically isolate the second actuator 160 from the second side surface 124 when the seating surface is in the collapsed position. More particularly, in various embodiments the second mechanical communication chain 170 is configured to be disengaged to allow the second side surface 124 to be manually repositioned towards a collapsed position. In various embodiments the second mechanical communication chain 170 is manually disengaged to mechanically isolate the second actuator 160 and the second side surface 124.

In various examples, the second mechanical communication chain 170 has a connector 176 that is configured to selectively mechanically couple and mechanically isolate the second actuator 160 relative to the second side surface 124. The connector 176 can be a feature that mechanically couples to (and selectively separates from) a mating feature of one of the second actuator 160 and the second side surface 124. The first end 172 of the second mechanical communication chain 170 can define a connector 176 that disengageably engages the second end 164 of the second actuator 160. The connector 176 and the second end 164 of the second actuator 160 can disengageably engage through a connection that has a similar or the same structure as the connection between the first end 152 of the first mechanical communication chain 150 and the second end 144 of the first actuator 140. In the example depicted, the connector 176 is a pin (best visible in FIG. 3) that is removably inserted in a pin opening 165 (visible in FIG. 2) defined by the second end 164 of the second actuator 160. Other types and locations of disengageable connectors between the second side surface 124 and the second actuator 160 can also be used, such as those described above with reference to the first actuator 140, the first mechanical communication chain 150, and the first side surface 122.

In various embodiments, a controller is operatively coupled to the actuator, such as the first actuator 140. The controller can be configured to control and direct movement of the first side surface 122. In some embodiments, the controller is operatively coupled to the first actuator 140 and the second actuator 160 and can be configured to control and direct movement of the first side surface 122 and the second side surface 124 independently of the first side surface 122. In some embodiments a first controller in operative communication with the first actuator 140 and a second controller in operative communication with the second actuator 160. In some other embodiments a single controller can be in operative communication with the first actuator and the second actuator. In some embodiments the one or more controllers are programmable through a user interface to facilitate regular or irregular moving of the first side surface 122 relative to the second side surface 124 when the chair 100 is in the expanded position.

The controller(s) has a user input device 168 configured to be manually manipulated by a user for adjusting the seating surface 120, where "manual manipulation" is used to include interacting with an electrical and/or computer interface. The user input device 168 of the controller can include a knob, handle, button, dial, touch screen, or the like. For example, the user input device 168 can include a first toggle switch accessible by a user and a second toggle switch accessible by a user. The user input device 168 can be coupled to the chair frame 110 at a location that is accessible to a seated user. For example, the user input device 168 can be coupled to an arm rest (not currently depicted) or on one of the siderails 112, 114. In some other embodiments the user input device 168 can be coupled to a vertical support rail 116.

In some embodiments the controller can be embodied as a type of device, appliance, computer, apparatus or controller of a computerized apparatus, or other apparatus capable of communicating with other edge, networking, or endpoint components. For example, the controller may be embodied as a personal computer, server, smartphone, a mobile compute device, a smart appliance, a self-contained device having an outer case, shell, etc., or other device or system in operative communication with the first actuator 140 and the second actuator 160. In some embodiments the controller is a programmable wi-fi capable microcontroller and a corresponding application through which the microcontroller can be programmed and operated. In some embodiments the controller is in wireless communication with the first actuator 140 and the second actuator 160. The controller will be described in more detail above with reference to FIG. 4.

In some embodiments the chair 100 can incorporate one or more sensors that are configured to provide input to the controller and/or a notification to a user. In some embodiments the controller is in data communication with one or all of the sensors. In some embodiments a sensor can be configured to detect the presence of an individual on the seating surface 120. In some embodiments, in response to a sensor detecting the lack of presence of an individual on the seating surface 120, the controller can be configured to stop or prevent operation of the actuators. Such a configuration may advantageously save electrical power, such as in embodiments where a battery is in electrical communication with the actuator(s) 140, 160. In some embodiments a sensor can be configured to detect the presence of an object such as a component, an appendage, or the like, in the lateral gap 129 between the first side surface 122 and the second side surface 124. In some such embodiments, in response to a sensor detecting the presence of an object in the lateral gap 129, the controller can be configured to stop/prevent or reverse operation of the actuator(s) 140, 160. Such a configuration may advantageously prevent damage to the chair 100 or the object in the lateral gap 129.

In some embodiments the sensor can be incorporated into one or both (in embodiments incorporating two actuators) actuators that is configured to identify a resistance to moving of the first side surface 122 and/or the second side surface 124 that exceeds a threshold. In some embodiments the sensor(s) are in operative communication with the controller (s) and may be configured to stop or reverse operation of the actuators via the controller(s).

In some alternate implementations of the technology disclosed herein, the chair 100 lacks a second actuator 170 and a second communication chain 170 extending from the second actuator 170 to the second side surface 124. In such implementations, the first actuator 140 and the first communication chain 150 are in operative control via the controller to move the first side surface 122 relative to the frame 110 and the second side surface 124. In such embodiments, the second side surface 124 can be configured to remain stationary in an expanded position. In some such embodiments, the second side surface 124 can be pivotably coupled to the frame 110 towards the second outer edge 125. The second side surface 124 can disengageably engage the frame 110 towards the second inner edge 127, where the second side surface 124 is configured to engage the frame 110 in an expanded position and be disengaged from the frame 110 to be moved to a collapsed position. In some such embodiments the second inner edge 127 of the second side surface 124 is manually pivotable around the second siderail 114 from the expanded position towards the collapsed position. In some alternate embodiments the second side surface 124 is not pivotable relative to the frame 110. In some embodiments the frame 110 remains coupled to the second inner edge 127 of the second side surface 124 to move the seating surface 120 into the collapsed position.

In the current example, the example chair 100 is a wheelchair. As such, the chair 100 has wheels 102, 104 coupled to the chair frame 110. In the current example, the wheels 102, 104 include drive wheels 102 and caster wheels 104, but in some embodiments the chair 100 can incorporate tracks, rollers, and/or other types of wheels. The one or more caster wheels 102 are rotatably coupled to the chair frame 110 towards the front end of the chair frame 110. The one or more caster wheels 102 are generally undriven wheels that are configured to accommodate directional motion of the chair 100 initiated and directed by the drive wheels 104. The one or more caster wheels 102 are generally freely swivelable about a vertical swivel axis relative to the chair frame 110. Each caster wheel 102 has a caster wheel axis, which the particular caster wheel 102 rotates around when the caster wheel is oriented in the longitudinal direction (such as shown in FIG. 1), which is in a forward orientation. In some embodiments, including the specific example depicted, the caster wheels 102 mutually define the caster wheel axis, such that the caster wheel axis is a shared axis that the caster wheels 102 rotate around when oriented in the longitudinal direction.

The drive wheels 104 are rotatably coupled to the chair frame 110 towards the back end of the chair frame 110. The drive wheels 104 are generally configured to propel the chair 100 over a ground surface and control the chair's direction. The drive wheels 104 can be manually propelled by a seated user, such as by grasping and rotating the wheels 104 relative to the chair frame 110. In some other embodiments the drive wheels 104 are in mechanical communication with an engine or a motor that is configured to selectively propel the drive wheels 104 to propel the chair 100 across the ground. A left and a right drive wheel 104 is rotatably coupled to left and right sides of a rear portion of the chair 100, respectively. The drive wheels 104 may be independently propelled (e.g., via a user's hands, one or more hydraulic motors, transmissions, or the equivalent) so that they may be driven independently of one another.

The drive wheels 104 are rotatable about a drive wheel axis that extends in the lateral direction. In some embodiments, the drive wheel axis is parallel to the caster wheel axis. Although the illustrated chair 100 has the drive wheels 104 in the rear, this configuration is not limiting. For example, other embodiments may reverse the location of the wheels, e.g., drive wheels in front and the caster wheel(s) in back. Moreover, other configurations may use different wheel configurations altogether, e.g., a tri-wheel configuration. Accordingly, other embodiments are possible without departing from the scope of the current technology. Notably, in some embodiments the chair lacks wheels and is configured to be stationary unless manually moved to a different location.

Exemplary Chair Processing Components

Figure 4:
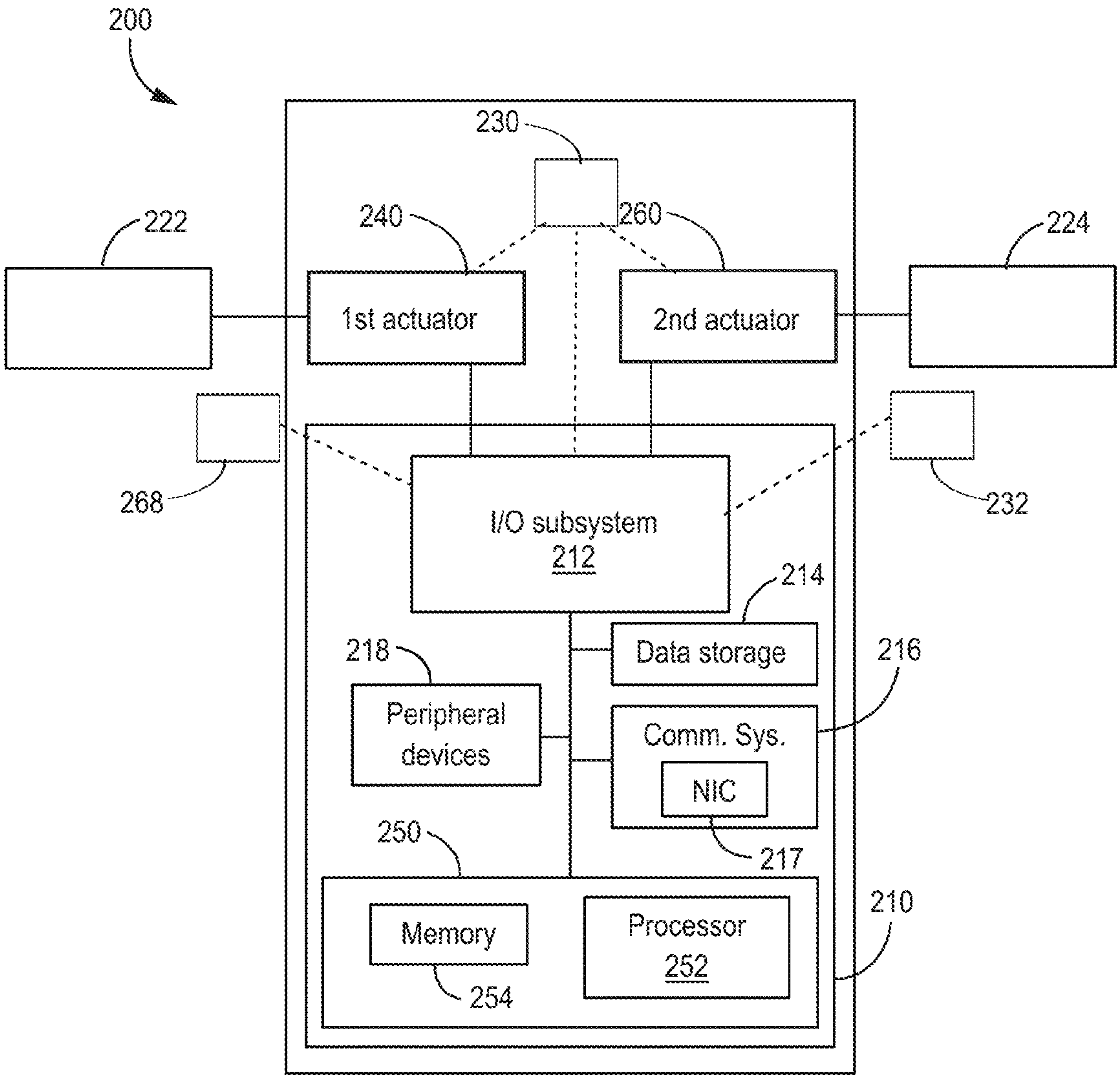
FIG. 4 is a schematic view of an example system consistent with the technology disclosed herein.

FIG. 4 is a schematic representation of components of a chair 200 consistent with various embodiments. The chair 200 has a chair frame having a seating surface with a first side surface 222 and a second side surface 224, consistent with descriptions above. The first side surface 222 is generally independently moveable relative to the second side surface 224. A first actuator 240 is coupled to the frame and is configured for operative communication with the first side surface 222. In the current example, the chair 200 has a second actuator 260 coupled to the frame that is configured for operative communication with the second side surface 224. In some embodiments, however, the second actuator 260 can be omitted.

A controller 210 is operatively coupled to the first actuator 240 and the second actuator 260 (where a second actuator 260 is present). controller 210 can be a separate device or a component of the chair 200. The controller 210 may be embodied as a type of device, appliance, computer, apparatus or controller 210 of a computerized apparatus, or other apparatus capable of communicating with other edge, networking, or endpoint components. For example, a controller 210 may be embodied as a personal computer, server, smartphone, a mobile compute device, a smart appliance, a self-contained device having an outer case, shell, etc., or other device or system capable of performing the described functions.

In the simplified example depicted in FIG. 4, the controller 210 includes processing circuitry 250, an input/output (I/O) subsystem 212, a data storage device 214, communication circuitry 216, and, optionally, one or more peripheral devices 218. In other examples, controller 210 may include other or additional components, such as those typically found in a computer (e.g., a display, peripheral devices such as keyboards, etc.). In some examples, one or more of the illustrative components may be incorporated in, or otherwise form a portion of, another component in the system rather than the chair 200 itself.

The controller 210 may be embodied as any type of engine, device, or collection of devices capable of performing various processing and controlling functions. In some examples, the controller 210 may be embodied as a single device such as an integrated circuit, an embedded system, a field-programmable gate array (FPGA), a system-on-a-chip (SOC), or other integrated system or device. In the illustrative example, the controller 210 includes or is embodied as a processor 252 and a memory 254. The processor 252 may be embodied as any type of processor capable of performing the functions described herein (e.g., executing an application). For example, the processor 252 may be embodied as a multi-core processor(s), a microcontroller, or other processor or processing/controlling circuit. In some examples, the processor 252 may be embodied as, include, or be coupled to an FPGA, an application specific integrated circuit (ASIC), reconfigurable hardware or hardware circuitry, or other specialized hardware to facilitate performance of the functions described herein.

The memory 254 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory 254 is a block addressable memory device, such as those based on NAND or NOR technologies. The memory device may refer to the die itself and/or to a packaged memory product. In some examples, all or a portion of the memory 254 may be integrated into the processor 252. The memory 254 may store various software and data used during operation such as one or more applications, data operated on by the application(s), libraries, and drivers.

The processing circuitry 250 is communicatively and operatively coupled to other components of the controller 210 via the I/O subsystem 212, which may be embodied as circuitry and/or components to facilitate input/output operations with the processing circuitry 250 (e.g., with the processor 252 and/or the memory 254) and other components of the processing circuitry 250. For example, the I/O subsystem 212 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 212 may form a portion of a system-on-a-chip (SoC) and be incorporated, along with one or more of the processor 252, the memory 254, and other components of the controller 210, into the processing circuitry 250.

The I/O subsystem 212 is configured to receive inputs from, among other devices and apparatuses, a user input device 268, and one or more sensors 230, 232. In various embodiments the processor 252 is in data communication with the one or more sensors 230, 232, such as through the I/O subsystem 212. The processor 252 is configured to receive electronic output signals from each of the sensors 230, 232. The electronic output signal received from the sensors 230, 232 may indicate whether, for example, a user is seated on the seating surface and/or whether the lateral gap between the seating surfaces 222, 224 is clear.

The processing circuitry 250 is configured to instruct the first actuator 240 and/or the second actuator 260 to move one or both of the first side surface 222 and the second side surface 224 consistently with input received. In some embodiments, the processor 252 is configured to issue a stop command to the first actuator 240 and/or the second actuator 260 in response to data received from the one or more sensors or the user input device 268. In some embodiments the processor 252 is configured to withhold a stop command to the first actuator 240 and/or the second actuator 260 in response to data received from the one or more sensors or the user input device 268. In some embodiments, the processor 252 can be configured to issue a run command. In some embodiments, the processor 252 can be configured to override input received through the user input device 268 based on data received from the one or more sensors 230, 232. In some embodiments the processor is configured to issue a command to reverse movement of the first side surface 222 and/or the second side surface 224 based on data received from the one or more sensors 230, 232.

The one or more illustrative data storage devices 214 may be embodied as any type of devices configured for short-term or long-term storage of data such as, for example, memory devices and circuits, memory cards, hard disk drives, solid-state drives, or other data storage devices. Individual data storage devices 214 may include a system partition that stores data and firmware code for the data storage device 214. Individual data storage devices 214 may also include one or more operating system partitions that store data files and executables for operating systems depending on, for example, the type of controller 210.

The communication circuitry 216 may be embodied as any communication circuit, device, or collection thereof, capable of enabling communications over a network between the processing circuitry 250 and another processing device (e.g., an edge gateway of an implementing edge computing system). The communication circuitry 216 may be configured to use any one or more communication technology (e.g., wired or wireless communications) and associated protocols (e.g., a cellular networking protocol such a 2GPP 4G or 2G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 216 can include a network interface controller (NIC) 217. The NIC 217 may be embodied as one or more add-in-boards, daughter cards, network interface cards, controller chips, chipsets, or other devices that may be used by the controller 210 to connect with another processing device. In some examples, the NIC 217 may be embodied as part of a system-on-a-chip (SoC) that includes one or more processors or included on a multichip package that also contains one or more processors. In some examples, the NIC 217 may include a local processor (not shown) and/or a local memory (not shown). In such examples, the local processor of the NIC 217 may be capable of performing one or more of the functions of the processing circuitry 250 described herein. Additionally, or alternatively, in such examples, the local memory of the NIC 217 may be integrated into one or more components of the client compute node at the board level, socket level, chip level, and/or other levels.

Additionally, in some examples, a respective controller 210 may include one or more peripheral devices 218. Such peripheral devices 218 may include any type of peripheral device found in a compute device or server such as audio input devices (e.g., speakers), a display, other input/output devices, interface devices, and/or other peripheral devices, depending on the controller 210. In further examples, the controller 210 may be embodied by a respective edge compute node (whether a client, gateway, or aggregation node) in an edge computing system or like forms of appliances, computers, subsystems, circuitry, or other components.

Instructions for implementing any of the methods described herein can be stored on a machine-readable medium. The machine-readable medium can include any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include compiling (e.g., from source code, object code, etc.), interpreting, loading, organizing (e.g., dynamically, or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A chair comprising:

a chair frame;

a seating surface comprising a first side surface movably coupled to the frame and a second side surface coupled to the frame, wherein the first side surface is independently moveable relative to the second side surface and each of the first side surface and the second side surface define a front end of the seating surface and a back end of the seating surface, wherein the seating surface has a collapsed position and an expanded position, and wherein the chair has a greater width when the seating surface is in an expanded position than the width of the chair in the collapsed position;

a first actuator coupled to the frame, wherein the first actuator is configured for operative communication with the first side surface; and wheels coupled to the frame, wherein the wheels comprise drive wheels and castor wheels.

2. The chair of claim 1, wherein each of the first side surface and the second side surface is pivotably coupled to the frame.

3. The chair of claim 2, wherein the chair frame comprises a first siderail and a second siderail and the first side surface is pivotably coupled to the first siderail and the second side surface is pivotably coupled to the second siderail.

4. The chair of claim 1, a controller operatively coupled to the first actuator, wherein the controller is configured to receive user input to control and direct movement of the first side surface.

5. The chair of claim 1, further comprising a second actuator in operative communication with the second side surface.

6. The chair of claim 1, the chair further comprising a back support coupled to the frame, wherein the width of the back support in the lateral direction in the expanded position is greater than the width of the back support in the lateral direction in the collapsed position.

7. A chair comprising:

a chair frame;

a seating surface comprising a first side surface and a second side surface, wherein the first side surface is independently moveable relative to the second side surface and each of the first side surface and the second side surface define a front end of the seating surface and a back end of the seating surface, the seating surface having a collapsed position and an expanded position;

a first actuator coupled to the chair frame; and a first mechanical communication chain configured to mechanically couple the first actuator and the first side surface when the seating surface is in the expanded position, and the first mechanical communication chain is configured to be disengaged to mechanically isolate the first actuator from the first side surface when the seating surface is in the collapsed position.

8. The chair of claim 7, wherein the first mechanical communication chain comprises a connector that is configured to selectively couple to and separate from a mating feature of the first actuator.

9. The chair of claim 7, wherein the first mechanical communication chain comprises a connector that is configured to selectively couple to and separate from a mating feature of the first side surface.

10. The chair of claim 7, further comprising wheels coupled to the frame.

11. The chair of claim 10, wherein the wheels comprise drive wheels and caster wheels.

12. The chair of claim 7, wherein the first side surface and the second side surface are each pivotably coupled to the frame.

13. The chair of claim 7, further comprising a first siderail and a second siderail, and the first side surface is pivotably coupled to the first siderail and the second side surface is pivotably coupled to the second siderail.

14. The chair of claim 7, further comprising a second actuator coupled to the chair frame; and a second mechanical communication chain configured to mechanically couple the second actuator and the second side surface when the seating surface is in the expanded position, and the second mechanical communication chain is configured to mechanically isolate the second actuator from the second side surface when the seating surface is in the collapsed position.

15. The chair of claim 7, further comprising a controller operatively coupled to the first actuator, wherein the controller is configured to receive user input to control and direct movement of the first side surface.

16. The chair of claim 7, wherein the seating surface has a collapsed position and an expanded position, and wherein the chair has a greater width when the seating surface is in an expanded position than the width of the chair in the collapsed position.

17. The chair of claim 16, the chair further comprising a back support coupled to the frame, wherein the width of the back support in the lateral direction in the expanded position is greater than the width of the back support in the lateral direction in the collapsed position.

* * * * *